Sept. 6, 1966    N. A. ANSTEY ETAL    3,271,732
METHOD AND APPARATUS FOR CORRELATING SEISMIC DISTURBANCES
AGAINST PREVIOUSLY RECORDED SIGNALS
Filed Jan. 4, 1963    3 Sheets-Sheet 3

INVENTOR
NIGEL ALLISTER ANSTEY
AND
BY WILLIAM EDWARD LERWILL
MASON, KOLEHMAINEN,
RATHBURN & WYSS
ATTORNEYS 3,271,732
METHOD AND APPARATUS FOR CORRELATING SEISMIC DISTURBANCES AGAINST PREVIOUSLY RECORDED SIGNALS
Nigel Allister Anstey and William Edward Lerwill, Kent, England, assignors to Seismograph Service Corporation, Tulsa, Okla.
Filed Jan. 4, 1963, Ser. No. 249,366
Claims priority, application Great Britain, Jan. 8, 1962, 661/62
15 Claims. (Cl. 340—15.5)

This invention relates to methods of and apparatus for the identification of earthquakes and other seismic disturbances.

The invention has for its principal object the provision of improved methods of and apparatus (including parts of apparatus) for use in the identification of or in obtaining information about earthquakes and other seismic disturbances.

A more particular object of the invention is the provision of improved methods of and apparatus for doing this, utilising seismic information which has previously been recorded, while a further object of the invention is to make use of previously recorded seismic information in the preparation of parts of apparatus which is to be used for identifying later seismic disturbances, which parts themselves represent an important feature of this invention.

It is well known that earthquakes are caused by the local readjustment of the earth's crust under stress, and that the movement which relieves this stress commonly occurs by shear fracture along a fault plane. The immediate locality of the movement is termed the focus of the earthquake, and the point on the earth's surface vertically above the focus is termed the epicentre.

It is also well known that earthquakes give rise to several types of elastic waves in the earth, and that it is these which are detected by seismograph stations and used to give information about the epicentre and depth of earthquakes. Amongst these waves the following should be listed particularly:

(a) The P wave, which is a refracted compressional wave characterised by relatively short period, brief duration and high velocity; this is normally the first arrival.

(b) The S wave, which is a refracted transverse wave of rather longer period and markedly lower velocity; this is normally the second major arrival.

(c) The surface waves, of both Love and Rayleigh type, which are characterised by considerably longer periods, by considerably lower velocities, by high amplitudes (except for very deep earthquakes) and by the phenomenon of dispersion.

In addition to these basic wave types, there exist many possibilities for mode transference and for multiple refraction and reflection at the various interfaces in the earth. Thus, for many minutes after the initial P arrival from a distant earthquake, a seismograph may record what appears to be a continuous succession of later arrivals. In this confused superposition of arrivals it is often difficult to distinguish (and in particular, to time) those primary wave types which are most useful for calculating the location of the earthquake.

Furthermore, all earthquakes are recorded against a background of microseismic activity, particularly minor earth movements which are believed to be associated with disturbances in the oceans; these sometimes obscure, in particular, the small but important P arrival.

Again, it sometimes happens that the P phase of an interesting but distant earthquake is superposed on a late arrival from another earthquake, and cannot, therefore, be identified with certainty.

The above factors mean that the picking and timing of earthquake seismograms is a highly skilled art, and that the positive identification and location of an earthquake may require lengthy deliberations based on the seismograms from several stations in different parts of the world.

However complicated may be the profusion of earth paths between an earthquake and a seismograph station, and however complicated may be the resulting seismogram, it remains true that two similar earthquakes which occur in the same place will, when recorded at the same station, produce seismograms having substantially similar characteristics, including features determined by the paths between the two places. On the other hand, an earthquake in any other place will in general produce a seismogram which is at least slightly different. This is so because of variations in crustal thickness, because of variations in wave velocities and because of the spheroidal nature of the earth. Judicious location of seismograph stations with reference to the main centres of earthquake activity can make this even more certain.

For any one station, then, every earthquake location will be associated with particular characteristics in its pattern, and, unless multiple reflections are strong or surface-wave dispersion is absent, this pattern will not include marked periodicities. This suggests that, once this pattern has been established for an earthquake location determined by conventional means, a re-occurrence of an earthquake in the same locality may be identified immediately by correlating, particularly by cross-correlating, the seismograph output against this pattern. It is, therefore, feasible to envisage a station where the seismograph signal is continuously cross-correlated against each of many known patterns, and where the place, depth, magnitude and time of most earthquakes can be printed out almost automatically.

It is accordingly an important object of the present invention to provide a method of and apparatus, or parts thereof, for use in identifying earthquakes or other seismic disturbances utilising the principle of correlation, particularly cross-correlation.

One of the objects of this inevntion is to provide a method for use in interpreting or identifying a seismic disturbance utilising a recording medium on which a seismic signal received from a disturbance to be identified is recorded and using a number of magnetic or other playback heads each of which has been formed so as to include a conducting trace the form of which has been derived from a previously-received seismic signal.

A further object of the invention is to provide such playback heads which are constructed utilising signals received from seismic disturbances, while a still further object of the invention is the provision of apparatus which includes a number of such heads and which is designed for use in identifying earthquakes or other seismic disturbances.

The assessment of magnitude in a seismograph signal, utilising the present invention and the principle of cross-correlation, is allowed for by the fact that the maximum in the output of the cross-correlator is directly proportional to the amplitude of the motion detected by a seismograph; further the presence of a double maximum can be taken as indicating a double shock, and a magnitude and time can be ascribed to each. Minor variations in the location of the earthquake appear as minor changes in the shape of the cross-correlation maximum, and may be interpreted from such.

When an earthquake has been identified by cross-correlation, using the method and apparatus of the invention, and when the form of the cross-correlation maximum has been inspected and its magnitude measured, it becomes possible to subtract from the recorded output of the seismograph the known pattern of the identified earthquake, multiplied by a factor representing the magnitude. This represents a valuable feature of the invention and has two major advantages. First, it means that the pattern for an earthquake from a locality not previously recorded can be determined, even when its arrivals are superimposed on those from another (even a larger) earthquake from a locality which has been previously recorded. Second, for those who are interested less in routine earthquake seismology than in the detection of unusual seismic events, it allows fuller concentration on signals which are not explained by earthquakes from known areas of high seismicity. It is also true that when such unusual events are found, a pattern is established which may be used to identify any further such events from the same locality, and to assess their magnitude.

One method of performing the operation of cross-correlation is by means of a digital computer. This is most suitable where a complete network of seismograph stations can be linked (by radio or land line) to a central computing facility. The great disadvantage of this arrangement, however, is its cost. We provide means for performing the cross-correlation process at a fraction of the cost involved with the digital approach. This in turn allows the establishment of a greater number of seismograph stations, and so a better resolution of seismic events.

It may be noted here that by the term "correlation" as used herein there is meant an assessment of the similarity or relationship between two quantities.

The term "cross-correlation" refers to a specific form of correlation which includes the steps, firstly, of imposing a delay on one function, secondly, multiplying the other function by the delayed function and, thirdly, integrating the product over a finite time.

The invention as to its organization and manner of operation together with further objects and advantages will best be understood by reference to the following detailed description taken in conjunction with the accompanying drawings wherein.

The correlator which will be herein described is an adaptation of or improvement in that which is described in the specification of our British application No. 16,687/61, filed May 8, 1961, and in the United States application Serial No. 190,912, filed April 30, 1962. In a preferred form, which can serve as a basis for this adaptation, the correlator which is similar to that described in the said applications may be arranged and operated as follows: A conventional (e.g. ¼ inch wide) magnetic tape is caused to move past a conventional recording head by a basically conventional tape transport arrangement. One of the two signals to be cross-correlated is recorded on the magnetic tape by the recording head, so that this signal takes the form of variations in intensity of magnetisation as a function of distance along the tape. The tape then passes over the playback head, which is an important part of the apparatus. It may have been made by the following method.

Figure 1:
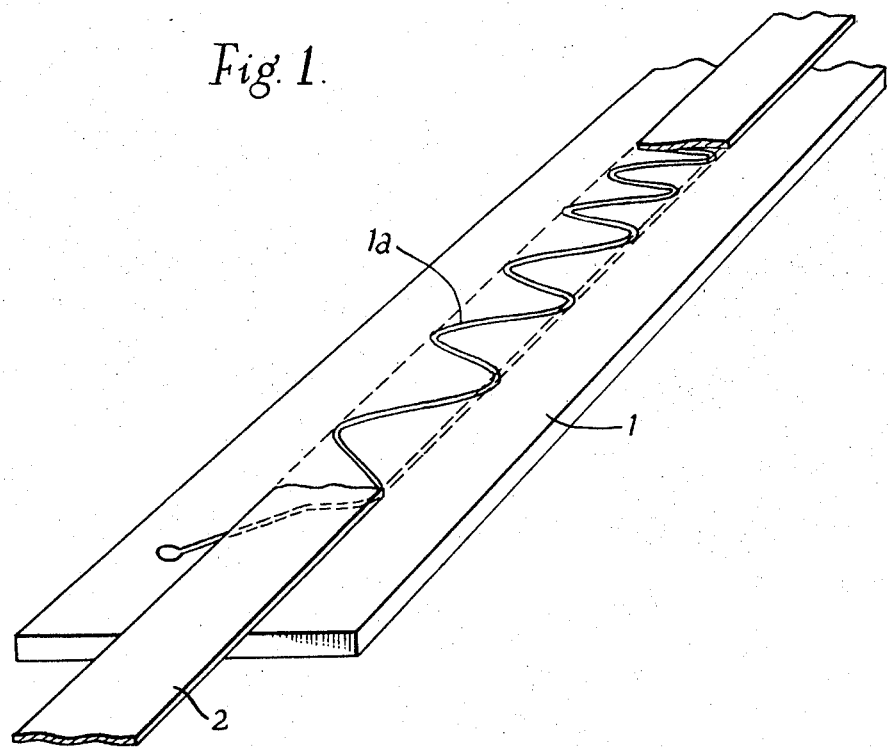
FIG. 1 is a fragmentary view, partially broken away, showing a correlating head which may be used in carrying out the present invention.

The second of the two signals to be cross-correlated, which, in the present instance, is a previously received seismic signal, is recorded on paper or film as a wiggly trace (typically by a galvanometric oscillograph) with a maximum amplitude which is slightly less than the width of the magnetic tape and with a time scale identical to the designed speed of the tape. This trace is then transformed (for instance by photographic and etching processes well known in the printed-circuit art) into a thin conducting line (having the configuration of the waveform) which is supported on or bonded to a suitable insulating base material (e.g., fibreglass). This provides the playback head which is illustrated at 1 in FIGURE 1 of the accompanying drawings.

The other of the signals to be correlated is, in the present case, one received from a seismic disturbance which it is desired to identify. This is recorded on magnetic tape 2, which is passed over the head 1. It is also passed over a number of other playback heads representing signals received from other seismic disturbances, as will be described.

The voltage which appears between the ends of the conducting strip 1a as the tape 2 passes over it is a measure of the cross-correlation of the signal recorded on the tape 2 with that representd by the waveform of the playback head 1, except for modification due to the normal processes of magnetic induction. The latter effects can be compensated, and true cross-correlation obtained, by a double integration applied before or after or partly before and partly after the playback process.

Figure 2:
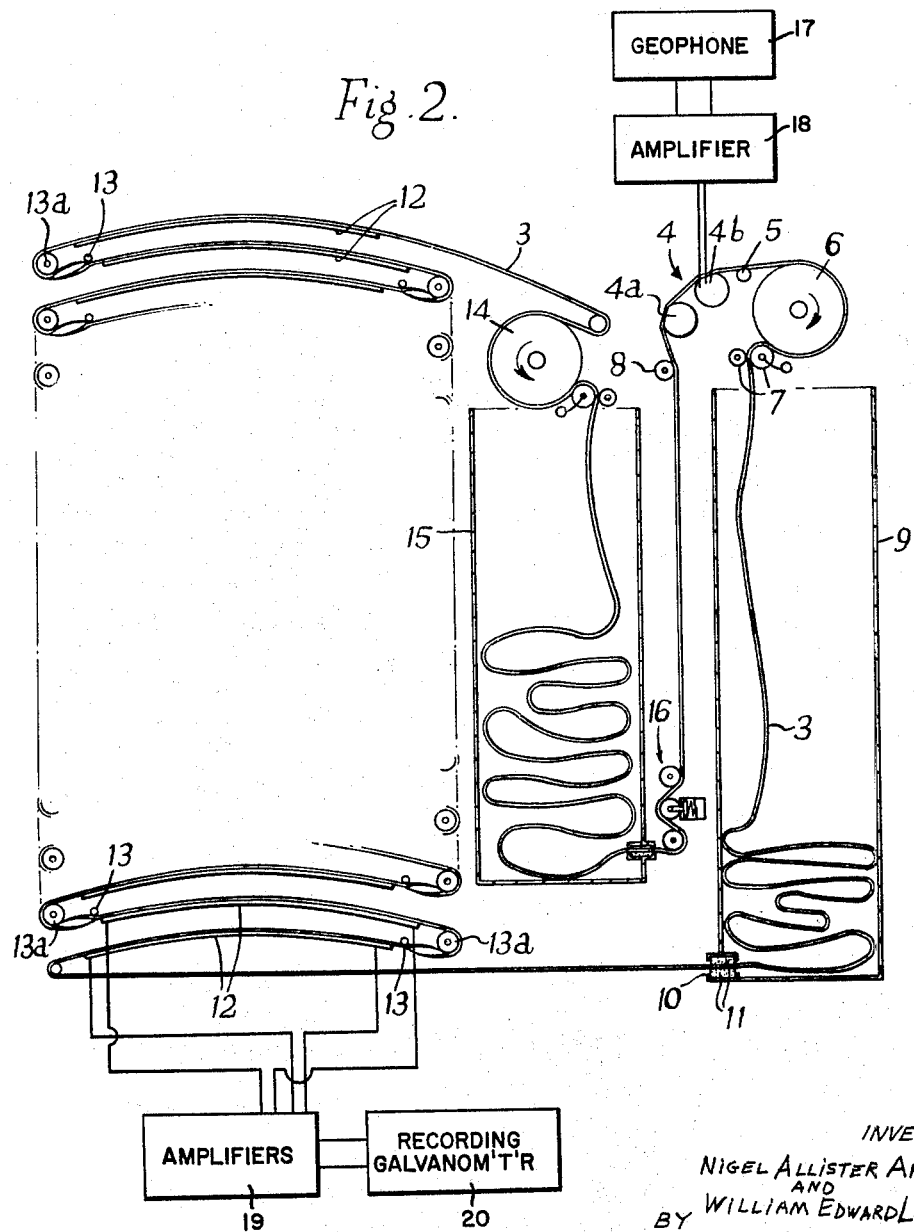
FIG. 2 is a sectional view showing schematically an apparatus characterized by the features of the present invention for recording signals on a reproducible tape, storing such tape and passing it over a number of correlating heads similar to the one illustrated in FIG. 1.

An example of apparatus for passing the tape over a number of playback heads in order to effect cross-correlation of the signal recorded on the tape with those represented by the waveforms of a number of playback heads is shown in FIGURE 2 of the accompanying drawings and will be more fully described hereinafter.

On account of the very large range of frequencies which are encountered in earthquake waves, it is customary to divide the detecting equipment into short-period and long-period seismographs; in general the short-period instruments are more useful for studies of the early arrivals from near earthquakes, while the long-period instruments are necessary for studies of the surface waves from distant earthquakes.

In a similar manner, the adaptation of the above correlator depends on the frequency band employed. For the fineness of the trace, limitations which are imposed on the printed strip by present-day printed-circuit techniques determine a minimum wavelength of about 0.020 inch on the printed strip, and this must be made to correspond to the shortest period recorded. If this is taken as 0.1 second for a short-period installation, the tape speed past the recording head must be of the order of 0.2 inch per second. A typical series of tremors lasting 3 minutes would then occupy 36 inches of the tape, and so this would be the length of the printed playback head required.

For a long-period detector, on the other hand, the highest frequency involved might be 0.2 c.p.s.; this leads to a recording tape speed of 0.004 inch per second and a printed playback head of length 14.4 inches for a series of tremors lasting one hour. All these dimensions are perfectly reasonable and the manner in which they are rendered possible represents an important feature of this invention.

The tape speeds quoted above refer to the recording process, during which the pattern of magnetisation is laid down on the tape; provided that this recording speed matches the time scale of the printed heads, the playback operation may be conducted at any speed. The playback speed chosen depends on the manner of display of the results, but if a galvanometric oscillograph is to be used, a tape speed of 3.75 inches/second (giving an apparent frequency of 10–200 c.p.s.) yields a reasonable compromise between head sensitivity, ease of amplification, and display response.

The following description is given for the case of a short-period installation and it exemplifies a number of features of this invention. Furthermore, it will be clear from the above dimensions and from the description how the system may be modified for a long-period installation.

FIGURE 2 shows a preferred form for the apparatus. A magnetic tape 3 (of a width which may typically be ½ inch) is caused to move past a conventional head bank which is indicated generally at 4. It may typically comprise a wide erase head 4a, a standard ¼ inch signal recording head 4b and a narrow-track time-marker recording head (not shown) which may be behind the head 4b. A conventional playback head or heads 5 may also be provided for monitoring purposes, if desired. The head 4b receives its signals from a geophone or pattern of geophones 17 through a conventional seismic amplifier system which is indicated generally at 18.

The tape movement, typically at 0.2 inch per second, is produced, without slippage, from a fairly large drive wheel 6 fitted with one or more pinch rollers 7. The wheel 6 is driven through high quality gearing from a synchronous motor (not shown) controlled from a stable frequency source. Various guide posts and/or rollers, such as 8, guide and constrain the tape 3 laterally.

From the drive wheel 6, the tape 3 spills into a chamber 9, in which can be stored the tape recorded during a period of perhaps three hours. At three-hourly intervals, then, the tape can be withdrawn from the chamber 9 for playback, through an outlet 10. It passes between light friction pads 11 and past any necessary guide rollers (not shown) to stabilise it, and then begins its passage over a considerable succession of printed playback heads 12. The tape, after leaving each of the heads 12 (except the last) passes round rollers 13 and 13a, between which it is twisted through 180° so as to ensure that all the heads 12 are contacted by the same side of the tape.

On leaving the topmost member of the stack of heads 12 the tape 3 passes over a drive wheel 14, which may be similar to the wheel 6 but which in this case gives a tape speed of 3.75 inches per second. Thereafter the tape spills into a second chamber 15, which may be similar to the chamber 9, so that during the playback part of the cycle (9 minutes) this chamber 15 becomes full. From the chamber 15 the tape is withdrawn continuously by the wheel 6, at the recording speed of 0.2 inch per second, via a tensioning system 16 and the head bank 4. For the quoted dimensions, the tape loop is about 350 ft. long.

Associated with each printed playback head 12 there may be a narrow conventional head (not shown) reading the time track on the magnetic tape, with its gap aligned to the onset of the P wave on the printed waveform. The output from each such conventional head may be mixed in suitable proportion with that from the corresponding printed head, to give coded timing pips superposed on each cross-correlation signal. Alternatively accurate engineering and alignment can allow adequate time information for all printed heads to be obtained from just one conventional time-track head.

Typically the cross-correlation signals from the fifty printed heads 12 are fed to an amplifier-integrator bank 19 (the connections from only two of the heads 12 being shown for the sake of clarity). After suitable amplification in the amplifier bank the signals may be applied to a multiple trace recording galvanometric oscillograph unit 20. 50-trace units, using either photographic paper or direct-writing ultra-violet sensitive paper, for example, are well known in the art of seismic exploration, and these may be adapted to a suitable paper speed (such as 2 inches per second).

Alternatively, some proportion of the 50 outputs may be mixed together (after suitable isolation) and the resulting trace displayed on a slow-moving chart recorder. Only if the recorder indicates an identified earthquake need the full 50-trace record be run, and then only for the duration necessary to cover the indicated time. This implies the necessity to pull back the tape for a second playback; this can be accomplished, for instance, by the provision of an additional "rewind" drive wheel (not shown) and spill box or chamber.

The number of seperate "levels" in a stack of printed heads may be reduced, or the number of heads may be effectively increased, by the use of a wider tape and the provision of several or many printed tracks side-by-side. A particular application of this, which forms an important feature of the present invention, exists where three-component seismographs are in use; then the printed playback heads appropriate to the three outputs can be provided on one supporting board or base and their outputs may be combined to increase the indication of correlation.

In this case three separate recording heads must be provided, each recording the signal from one movement of the seismograph; where wide tape is used merely to compress the number of levels in the head stack, or to increase the capacity of the device, the several recording heads will all record the same signal. Alternatively, they may be replaced by one head occupying almost the full width of the tape, leaving only one narrow track for the timing signal.

It will be apparent that many modifications are possible in the mechanical tape and drive system which has been described, without departing from the spirit and scope of the invention; the apparatus as described merely represents a preferred embodiment.

One important alternative applies to cases where seismometer output is being recorded on tape as part of the normal working of a seismographic station. Facilities may already exist for the recording of one day's seismic activity on a reel of tape, and for the playback of this tape at higher speed for analysis purposes. In such cases the speeded-up playback output may be applied to the recording head (the head 4b) of the present invention, with the tape moving always at the higher speed. This makes it possible to omit the slow-speed drive 6 and the spill-boxes 9 and 15 from the apparatus shown in FIGURE 2 and renders it unnecessary to check the data more frequently than, say, once a day.

Figure 4:
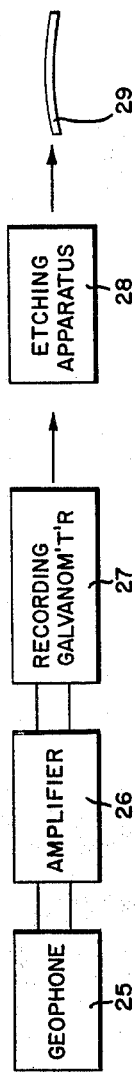
FIG. 4 illustrates schematically the sequence followed in developing a correlating head of the type illustrated in FIG. 1.

The printed playback heads (1 or 12) themselves are made from the best available record of each identified earthquake. This may be done, typically, by transcription to a photographic galvanometric oscillograph whose film is transported at exactly the same speed as that of the tape past the recording heads (which is 0.2 inch per second in the example given). The amplitude is adjusted so as to be confined within the width of the record head (typically ¼ inch). The printed playback head may then be made from this photographic master, which may be done by etching processes such as are well known in the printed-circuit art. The sequence of steps in the production of a playback head is illustrated purely diagrammatically in FIG. 4. The signals received by a geophone (or geophone bank) 25 are fed through an amplifier 26 to a photographic galvanometric oscillograph 27. The film produced by this oscillograph is then transferred to an etching apparatus 28 for producing the printed circuit type conductor for the transducing head, here indicated at 29. Selected heads 29, after suitable finishing and mounting, which may be done as is more fully described in our aforesaid British application No. 16,687/61 and United States application Serial No. 190,912, are assembled in the apparatus shown in FIG. 2, where they take the place of the heads 12.

The above method is inexpensive, so that when a better example of an earthquake location is obtained the old playback head may be discarded and a new one made. In particular, it is advantageous if the earthquake is recorded at a time when microseisms are low; then the cross-correlation process yields a marked improvement in the earthquake-to-microseism ratio for later earthquakes.

It may be desirable, in some cases, to "weight" the contribution of particular parts of the seismogram to the cross-correlation shape, for instance to weight the significance of the early part of the train of seismic arrivals. This may be done in two ways.

According to the first, the gain of the amplifier used in making the master film for the printed head may be progressively reduced during the train of arrivals. In this way the amplitudes of the early arrivals on the printed head (and hence its sensitivity in these parts) will be elevated relative to later arrivals.

In the second method, advantage may be taken of the fact that, in general, early arrivals represent higher frequencies than do late arrivals. Thus a high-frequency emphasis will tend to enhance the significance of early events.

Sometimes a combination of these two methods is desirable, being directed, for instance, toward equating the contribution of P, S and surface waves.

It has been mentioned that the output of a printed playback head requires a double integration (a 12 db/octave high-frequency cut) in order to produce true cross-correlation. If this is not provided, the cross-correlation will have a strong high-frequency emphasis. This furnishes a convenient way of producing the high-frequency emphasis discussed above, since simple RC equalisers may be provided to give, for example, 0, 6 or 12 db/octave cuts in the amplifier following the printed head.

In general, only minor weighting of the early part of the seismogram is required for short-period instruments. For distant earthquakes, detected by long-period instruments, the contribution of the surface waves will be predominant unless some weighting is used. Of course, for some purposes it may be the surface waves which are of major interest; in this case the fact that the surface waves are dispersed allows the cross-correlation to be a fairly sharp pulse, quite adequate for many timing purposes. The connection between this use of cross-correlation and the techniques of pulse-compression will be obvious to those skilled in seismic work.

Figure 3:
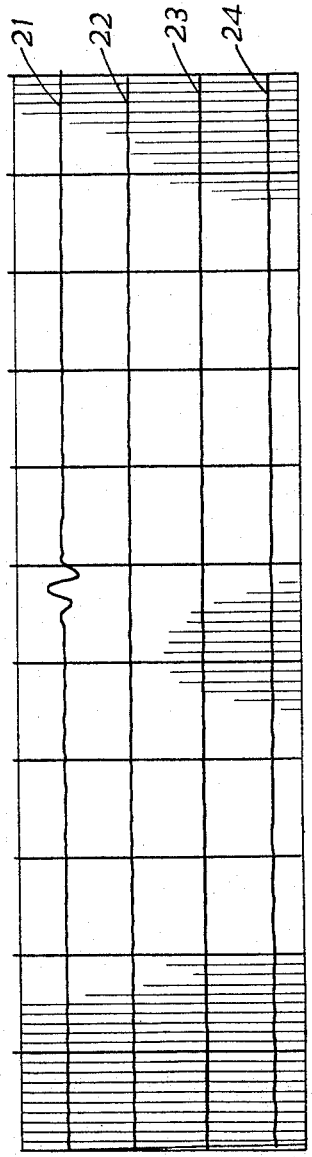
FIG. 3 is a graph illustrating the results obtained from a typical correlation carried out by the method and apparatus of the present invention.

Referring now to FIGURE 3, this illustrates an actual result obtained. It shows graphically the outputs of a typical printed-circuit head when traversed by magnetic tape on which four signals had been recorded. The head itself had been prepared from a seismic signal which was received in New Jersey and which originated from an earthquake in Nevada, United States of America.

The first signal, the output from which is shown at 21, was from the Nevada earthquake itself, while the other lines 22, 23 and 24 illustrate respectively the outputs produced by, respectively, an earthquake in the Molucca Islands and two nuclear explosions in the United States of America. Although the frequency spectra, the amplitude levels and the general appearances of the four signals received were broadly comparable, the results of the cross-correlation operations are shown to identify the desired signal quite positively and to reject the others.

Although the apparatus has been described with reference to direct magnetic recording, adaptations are feasible with systems of amplitude-modulation, frequency-modulation, or pulse-width-modulation. The use of such adaptations eliminates the need for a playback speed different from the recording speed. Further, the invention is not restricted to magnetic recording, but is applicable to the general case of the cross-correlation of two time-variables, where one (the signal on the tape in the apparatus described) can take the form of a spatial distribution of some physical property, and the other (the printed head in the apparatus described) can take the form of a matched spatial distribution of detecting means sensitive to that physical property. Other methods of recording therefore fall within the scope of the invention, and electrostatic recording is mentioned as a suitable example.

Further, the invention is not restricted to the recognition of signals within the frequency band quoted, but may be adapted to recognise signals either above or below this range.

In the preceding description it has been assumed that the playback heads are produced from major seismic disturbances, whether of natural origin (earthquakes) or of man-made origin (nuclear or other explosions). It is, however, possible and it forms a further valuable feature of this invention to make use of artificial seismic signals which, while being long drawn-out, are far less in amplitude than those produced by earthquakes or nuclear explosions.

The use of such man-made test signals, which can be initiated when and where required and at reasonable cost, offers the important advantage that master playback heads representing the characteristics of a wide range of earth paths can be prepared in advance, without having to wait for an earthquake or nuclear explosion to take place at each point of origin where such an event is thought likely to occur again.

Test signals can, in fact, be generated by using power-driven vibrators arranged on or in the surface of the earth. Using such vibrators it is possible to obtain information about the impulse response or transmission characteristics of particular earth paths between any desired number of points or origin and points of reception, utilising cross-correlation technique, and form such information to prepare playback heads which can then be used in identifying later seismic signals originating from any of the original test points, in spite of the fact that such later signals, whether of natural or man-made origin, will normally be very different from the original test signals.

In order to apply this principle to the present invention a hydraulic or other power-driven vibrator may be used which will impart vibrations to the earth's crust. These vibrations must cover a substantial freqeuncy band, which is preferably a little wider than that of the detecting instruments which will be used, without repetition of any parts of the frequency pattern. The signal may, for example, have a swept-frequency pattern or it may have an arbitrary and apparently random patern, providing that repetition is avoided.

One suitable form of apparatus might consist of a hydraulically-operated vibrator comprising a piston which is reciprocated in a cylinder as a result of hydraulic pressure applied alternately to opposite ends of the cylinder under the control of suitable valves. These valves would themselves be controlled by suitable means, such as by a cam mechanism, in order to produce a suitable variation in frequency with time. One of the parts of the vibrator, which might be one connected to the piston or to the cylinder, engages or is embedded in the ground, while the other part (cylinder or piston, as the case may be) is connected to or forms part of a structure having considerable mass and inertia. The arrangement is such that when the vibrator is operated seismic signals of a suitable frequency pattern and duration are generated in the earth's crust and these signals are picked up at one or at a number of receiving stations.

At such a receiving station the signal received is recorded, preferably on magnetic tape; using this record the waveform of the received signal is then cross-correlated with the pattern of the original signal which was transmitted. To do this an extended playback head is first produced the waveform of the conducting trace of which reproduces the waveform of the transmitted signal. This may be done in a manner which is similar to one which we have devised for determining the transfer characteristics of industrial systems and which is described in British application No. 44,321/61, filed December 11, 1961, and in our corresponding United States application Serial No. 243,448, which was filed on December 10, 1962.

Although the amplitude of the test signal transmitted will be very much less than that of signals of natural or nuclear origin, the fact that the test signal can be transmitted over a considerable period, for example by using a very long frequency sweep, makes it possible to obtain information about the impulse response of the path in question by cross-correlating the transmitted signal against the signal which is received from it at a particular detecting station. In this way any desired areas of the earth's surface may be investigated, using one or more mobile vibrators which are caused to transmit at selected points; these could be ones agreed internationally.

Observations could be taken at a number of points which are sufficiently close together to ensure that substantially simultaneous correlation is obtained of compressional, shear and surface waves of any subsequent event, wherever the latter may occur. This may be done by using the results of the above cross-correlation of transmitted and received test signals to produce extended playback heads the waveforms of which are characteristic of the transmission characteristics of the earth's crust along paths between the various receiving stations and the original test points.

We claim:
1. A method of obtaining information about a seismic signal for use in identifying its source, which method comprises producing from each of a number of prior seismic signals respectively received at a given receiving location from a variety of sources a longitudinally extending transducer assembly having a sensitivity distributed along its length as a function of the waveform of the corresponding prior seismic signal, producing from a subsequent seismic signal arriving at said location an energy pattern representing the waveform of this subsequent signal, causing said energy pattern to pass along each of the transducer assemblies, developing from each transducer assembly a signal representing the effect of said energy pattern upon that transducer assembly, said signal being indicative of the correlation between the waveform of said subsequent seismic signal and that of the prior seismic signal corresponding to the transducer assembly, and recording the correlation signals obtained from each transducer assembly for comparison, thereby to facilitate identification of the source of said subsequent seismic signal by comparison with the seismic signals received at said location from each of said variety of sources.

2. A method of obtaining information for identifying the origin of seismic signals produced by disturbances, which method comprises the steps of making records respectively representing a number of prior seismic signals arriving at a predetermined location from different places of origin; producing from each of said records a longitudinally-extended magnetic playback head having a sensitivity pattern which is characteristic, at least in part, of the waveform of the received signal from which it has been produced; producing on a magnetic tape, from a seismic signal arriving at said location from an unknown source, a record of this last named signal; and passing said tape over said playback heads in series one after the other in order to cross-correlate, at least in part, the recorded wave form of said last named signal with each of the said prior signals as represented by said playback heads.

3. A method according to claim 2 wherein the step of producing said magnetic tape is effected by recording said last named signal on a recording tape at a predetermined speed and wherein the step of passing the tape over the playback heads is carried out at a speed considerably greater than said one speed, said method including the additional step of storing said magnetic tape after it has been produced so that it may be subsequently passed at said greater speed over the playback heads in series.

4. A method according to claim 2 which further includes the step of producing a visible record of the correlation signal produced by each playback head in order to permit comparison of the various correlation signals and, hence, to facilitate identification of the source of said last named signal.

5. A method of analyzing seismic wave disturbances in the earth formations which includes the steps of receiving signals at a predetermined location from a plurality of remote points, said signals as received having an extended non-repetitive frequency pattern, producing a plurality of extended playback heads each having a conducting trace representing the waveform of one of said received signals, recording a subsequent seismic signal arriving at said location on a record medium, passing said record medium over the playback heads in sequence one after the other, obtaining from each head a signal representing the cross-correlation between said subsequent seismic signal and that arriving at said location from one of said remote points via a transmission path through the earth formations, producing from the signals obtained from said heads a plurality of records for correlating the pattern of said subsequent seismic signal with the transmission characteristics of the different paths of the signals received at said location at said remote points, thereby to identify said subsequent seismic signal with one of these paths.

6. The method according to claim 5 which further includes the step of producing a visible record of signals obtained from each playback head, thereby to facilitate said correlation.

7. A method according to claim 5 wherein the step of producing said record medium is effected by recording said subsequent seismic signal on a magnetic tape at a predetermined speed and wherein the step of passing the record medium over the playback heads is carried out at a speed considerably greater than said predetermined speed, said method further including the step of storing the tape after it has been produced and prior to its passage over the playback heads.

8. Apparatus for use in identifying a seismic disturbance creating seismic waves for reception at a predetermined location, said apparatus comprising a plurality of playback heads having sensitivities distributed along their length respectively representing the waveforms of prior seismic signals arriving at said location from different known points of origin, means for recording on a record medium a signal derived from said seismic waves, means for passing said record medium past said playback heads in series to cause the recorded signals to coact with the playback heads, each of said heads providing a correlation signal when the waveform of the recorded signal coincides, at least in part, with the waveform of the prior seismic signal represented by that head, whereby the waveform of the seismic waves is correlated with the waveforms of each of said prior seismic signals, and means for displaying each of said correlation signals for use in identifying the source of said seismic waves.

9. The apparatus defined by claim 8 wherein said recording means includes structure for recording the seismic waves on a magnetic record medium and wherein each of said playback heads includes a conducting trace in which electrical currents are induced by the passage past the trace of said record medium in order to determine the degree of correlation between the waveform of at least a portion of said seismic waves and those of the conducting traces of the playback heads.

10. The apparatus defined by claim 9 wherein there is further provided means for maintaining the playback heads in spaced apart relation one above the other, said passing means being effective to move said record medium past said playback heads in sequence one after the other.

11. Apparatus as defined by claim 8 wherein at least some of the playback heads include conducting traces arranged side by side on an insulating base and wherein said record medium is provided with a number of magnetic recordings which are passed over the respective conducting traces by said passing means.

12. The apparatus defined by claim 8 wherein means are provided for maintaining the playback heads in sets of three, each playback head having a conducting trace in which an electrical current is induced by the passage of the record medium over the trace, said record medium having three record tracks recorded thereon respectively representing different components of seismograph recordings made from said seismic waves.

13. The apparatus defined by claim 8 wherein the means for recording is effective to record the received seismic waves on said record medium at a predetermined speed, means for storing said record medium subsequent to said recording, said passing means including means for passing said record medium from said storing means over said playback heads at a speed considerably greater than said predetermined speed.

14. The apparatus defined by claim 8 wherein the means for recording includes structure for recording the seismic wave on an elongated magnetic tape at a predetermined speed, means for storing the magnetic tape after the recording has been effected, said passing means including means for passing said magnetic tape from said storage means over said playback heads at a speed considerably greater than said predetermined speed.

15. The apparatus defined by claim 14 wherein said magnetic tape is endless and wherein said apparatus further includes at least one erase head for erasing recordings from the magnetic tape after the latter has passed the last of the playback heads, and means for returning the record medium from the erase head to said recording means for subsequent recording of later arriving seismic waves.

References Cited by the Examiner
UNITED STATES PATENTS

| | | | |
|---|---|---|---|
| 2,721,990 | 10/1955 | McNaney | 340—174 |
| 2,794,965 | 6/1957 | Yost | 340—15.5 |
| 2,995,727 | 8/1961 | Quade | 340—149 |
| 3,011,582 | 12/1961 | Peterson | 181—153 |
| 3,109,156 | 10/1963 | Anderson | 340—15.5 |
| 3,127,508 | 3/1964 | Doty et al. | 340—15.5 |
| 3,131,375 | 4/1964 | Watson | 340—15.5 |
| 3,136,974 | 6/1964 | Sirks | 340—15.5 |
| 3,174,142 | 3/1965 | Mallinckrodt | 340—15.5 X |

BENJAMIN A. BORSHELT, *Primary Examiner.*

CHESTER L. JUSTUS, *Examiner.*

R. M. SKOLNIK, M. F. HUBLER, *Assistant Examiners.*